US011292601B2

(12) United States Patent
Uefuji et al.

(10) Patent No.: US 11,292,601 B2
(45) Date of Patent: Apr. 5, 2022

(54) ANTI-ICING SYSTEM OF AIRCRAFT, AIRCRAFT INCLUDING ANTI-ICING SYSTEM, PROGRAM FOR CONTROLLING ANTI-ICING SYSTEM, AND METHOD FOR CONTROLLING ANTI-ICING SYSTEM

(71) Applicant: MITSUBISHI AIRCRAFT CORPORATION, Aichi (JP)

(72) Inventors: Yoichi Uefuji, Tokyo (JP); Masatoshi Morishita, Tokyo (JP); Toshiyuki Ishida, Tokyo (JP); Gento Ichikawa, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 1195 days.

(21) Appl. No.: 15/456,782

(22) Filed: Mar. 13, 2017

(65) Prior Publication Data
US 2017/0275005 A1 Sep. 28, 2017

(30) Foreign Application Priority Data
Mar. 24, 2016 (JP) ............... JP2016-59330

(51) Int. Cl.
*B64D 15/04* (2006.01)
*B64D 15/20* (2006.01)
*B64D 15/02* (2006.01)
*B64D 13/06* (2006.01)
*B64D 13/02* (2006.01)

(52) U.S. Cl.
CPC ............. *B64D 15/04* (2013.01); *B64D 13/06* (2013.01); *B64D 15/20* (2013.01); *B64D 13/02* (2013.01); *B64D 15/02* (2013.01); *B64D 2013/0607* (2013.01); *B64D 2013/0618* (2013.01); *Y02T 50/50* (2013.01)

(58) Field of Classification Search
CPC ......... B64D 15/02; B64D 15/04; B64D 15/20
USPC ............................................. 701/3
See application file for complete search history.

(56) References Cited

U.S. PATENT DOCUMENTS 3,487,993 A * 1/1970 Rannenberg ........ F04D 27/0223
415/28
4,671,318 A * 6/1987 Benson .................. B64D 13/00
137/486

(Continued)

FOREIGN PATENT DOCUMENTS

JP          5122465 B2    1/2013

*Primary Examiner* — Timothy D Collins
*Assistant Examiner* — Terri Lynn Filosi
(74) *Attorney, Agent, or Firm* — Pearne & Gordon LLP

(57) ABSTRACT

An anti-icing system at least includes: a precooler that exchanges heat between bleed air and outside air; and an anti-icing unit that receives the bleed air passed through the precooler. A bleed air flow rate adjusting section that adjusts a flow rate of the bleed air supplied to the anti-icing unit adjusts the flow rate of the bleed air to suppress pressure of the bleed air to a pressure upper limit or lower by using relationship r1 and relationship r2. The relationship r1 is a relationship between an altitude and a pressure upper limit of the bleed air. The relationship r2 is a relationship between the pressure upper limit and outside air temperature at which the temperature of the bleed air reaches allowable temperature of ducts and other members through which the bleed air flows. The relationship r2 is provided based on the altitude.

20 Claims, 9 Drawing Sheets

(56) References Cited

U.S. PATENT DOCUMENTS

2009/0235670 A1    9/2009  Rostek et al.
2010/0288890 A1*  11/2010  Gatzke .................. B64D 13/08
                                                        244/53 R

* cited by examiner

FIG. 4

| | a0 | a1 | a2 | a3 | | an-2 | an-1 | an |
|---|---|---|---|---|---|---|---|---|
| t0 | P(0,0) | P(1,0) | P(2,0) | P(3,0) | | P(n-2,0) | P(n-1,0) | P(n,0) |
| t1 | P(0,1) | P(1,1) | P(2,1) | P(3,1) | | P(n-2,1) | P(n-1,1) | P(n,1) |
| t2 | P(0,2) | P(1,2) | P(2,2) | P(3,2) | | P(n-2,2) | P(n-1,2) | P(n,2) |
| t3 | P(0,3) | P(1,3) | P(2,3) | P(3,3) | | P(n-2,3) | P(n-1,3) | P(n,3) |
| tn-2 | P(0,n-2) | P(1,n-2) | P(2,n-2) | P(3,n-2) | | P(n-2,n-2) | P(n-1,n-2) | P(n,n-2) |
| tn-1 | P(0,n-1) | P(1,n-1) | P(2,n-1) | P(3,n-1) | | P(n-2,n-1) | P(n-1,n-1) | P(n,n-1) |
| tn | P(0,n) | P(1,n) | P(2,n) | P(3,n) | | P(n-2,n) | P(n-1,n) | P(n,n) |

ALTITUDE E1

OUTSIDE AIR TEMPERATURE E2

12

ANTI-ICING SYSTEM OF AIRCRAFT, AIRCRAFT INCLUDING ANTI-ICING SYSTEM, PROGRAM FOR CONTROLLING ANTI-ICING SYSTEM, AND METHOD FOR CONTROLLING ANTI-ICING SYSTEM

BACKGROUND OF THE INVENTION

Field of the Invention

The present invention relates to an anti-icing system of an aircraft that cools bleed air to appropriate temperature through heat exchange with outside air and uses the bleed air for anti-icing of a wing and the like.

Description of the Related Art

A system that precools bleed air extracted from an engine or an auxiliary power unit of an aircraft with use of outside air and supplies the cooled bleed air to an anti-icing unit of a wing, an air conditioner, and the like is well known.

A bleed air supply system disclosed in Japanese Patent No. 5122465 measures temperature near an airframe and components thereof. When leakage of the bleed air from a line through which the bleed air flows is detected based on the measured temperature, the bleed air supply system closes a valve near a leakage position to separate a section in which the leakage occurs from other sections in order to minimize influence of the leakage of the bleed air to the airframe and the components thereof. This interrupts the supply of the bleed air to the unit relating to the section in which the leakage occurs. In other words, it is necessary to manage the bleed air from the engine or the auxiliary power unit because the temperature of the bleed air is high.

Incidentally, an anti-icing unit of a wing precools the bleed air with use of outside air by a heat exchanger such that the temperature of the bleed air becomes a predetermined value under a specified icing condition. A capacity of the heat exchanger is also so designed as to exert sufficient performance under the condition. However, when the anti-icing unit is operated in order to further improve the anti-icing performance within the range that is within the operating range of the aircraft but does not require the anti-icing performance because of moderate icing, namely, within the range out of the specified icing condition, precooling of the bleed air by the outside air becomes insufficient in an airspace in which outside temperature is high or air density of the outside air is low. To prevent the insufficiently-cooled bleed air from influencing a duct configuring the line of the precooled bleed air, the supply of the bleed air is stopped in the airspace.

Accordingly, the present invention provides a system that performs control to maximally exert performance of the anti-icing unit of the aircraft under various restriction condition even within an entire region of a condition of the outside air temperature and the altitude at which the aircraft is operated.

SUMMARY OF THE INVENTION

An anti-icing system according to the present invention prevents icing on an aircraft with use of bleed air heat-exchanged with outside air, and the anti-icing system includes: a heat exchanger that exchanges heat between the bleed air and the outside air; a supply destination that receives the bleed air passed through the heat exchanger; and a control section that adjusts a flow rate of the bleed air supplied to the supply destination. The control section includes a bleed air flow rate adjusting section that adjusts the flow rate of the bleed air supplied to the supply destination.

The bleed air flow rate adjusting section uses a first relationship and a second relationship. The first relationship is a relationship between an altitude and a pressure upper limit that is an upper limit of pressure of the bleed air. The second relationship is a relationship between outside air temperature at which temperature of the bleed air reaches allowable temperature of a member (hereinafter, referred to as a bleed air duct or other members) through which the bleed air flows and a pressure upper limit that is an upper limit of pressure of the bleed air, and is provided based on the altitude.

When outside air temperature is lower than outside air temperature at an intersection of the first relationship and the second relationship, the bleed air flow rate adjusting section adjusts the flow rate of the bleed air to suppress the pressure of the bleed air to the pressure upper limit or lower of the first relationship. In other words, when outside air temperature is lower than outside air temperature at an intersection of the first relationship and the second relationship, the bleed air flow rate adjusting section adjusts the flow rate of the bleed air while suppressing the pressure of the bleed air to the pressure upper limit or lower of the first relationship. When the outside air temperature is higher than the outside air temperature at the intersection, the bleed air flow rate adjusting section adjusts the flow rate of the bleed air to suppress the pressure of the bleed air to the pressure upper limit or lower of the second relationship. In other words, when the outside air temperature is higher than the outside air temperature at the intersection, the bleed air flow rate adjusting section adjusts the flow rate of the bleed air while suppressing the pressure of the bleed air to the pressure upper limit or lower of the second relationship.

As described in detail later, according to the present invention, since the bleed air pressure is adjusted with use of the second relationship, the temperature of the bleed air does not exceed the allowable temperature of the bleed air duct and other members even if the outside air temperature cooling the bleed air is high. This eliminates the need for processing of interrupting supply of the bleed air due to overheating of the bleed air duct or other members, and makes it possible to secure anti-icing performance while continuing the supply of the bleed air.

In the anti-icing system according to the present invention, the bleed air flow rate adjusting section may preferably use map data provided with the pressure upper limit, and the pressure upper limit of the map data may be preferably determined based on the first relationship and the second relationship. The pressure upper limit may be a function of an altitude and outside air temperature.

Further, an anti-icing system according to the present invention prevents icing on an aircraft with use of bleed air heat-exchanged with outside air, and the anti-icing system includes: a heat exchanger that exchanges heat between the bleed air and the outside air; a supply destination that receives the bleed air passed through the heat exchanger; and a control section that adjusts a flow rate of the bleed air supplied to the supply destination. The control section includes a bleed air flow rate adjusting section that adjusts the flow rate of the bleed air supplied to the supply destination. The bleed air flow rate adjusting section uses a first relationship and a temperature threshold. The first relationship is a relationship between an altitude and a pressure upper limit that is an upper limit of pressure of the bleed air. The temperature threshold is set lower by a predetermined value than allowable temperature of a member through which the bleed air flows. When temperature of the bleed air is lower than the temperature threshold, the bleed air flow rate adjusting section adjusts the flow rate of the bleed air to suppress the pressure of the bleed air to the pressure upper limit or lower of the first relationship. When the temperature of the bleed air is higher than the temperature threshold, the bleed air flow rate adjusting section adjusts the flow rate of the bleed air to suppress the temperature of the bleed air to the allowable temperature or lower.

The present invention makes it possible to more reliably suppress the temperature of the bleed air duct and other members to the respective allowable temperature or lower and to largely secure the flow rate of the bleed air based on the temperature of the bleed air when the temperature of the bleed air is higher than the temperature threshold.

The present invention also eliminates the need for processing of interrupting supply of the bleed air due to overheating of the bleed air duct or other members, and makes it possible to secure anti-icing performance while continuing the supply of the bleed air.

In the anti-icing system according to the present invention, an icing condition and an operating condition are assumed. The icing condition is a range of an altitude and outside air temperature at which icing possibly occurs. The operating condition encompasses the icing condition and is a range of an altitude and outside air temperature at which the aircraft is flyable. The member through which the bleed air flows is designed to be maintained at the allowable temperature or lower under the operating condition. In other words, the member through which the bleed air flows is adapted to be used such that a temperature of the member is maintained at the allowable temperature or lower under the operating condition.

The present invention does not lead interruption of the bleed air supply due to overheating of the duct and other members, and makes it possible to maintain constant anti-icing performance even out of the range of the icing condition.

An aircraft according to the present invention includes the above-described anti-icing system.

The present invention can be developed to a computer program for controlling the anti-icing system of the aircraft, a computer readable storage medium storing the computer program, or to a method of controlling the anti-icing system of the aircraft.

A computer program according to the present invention controls an anti-icing system of an aircraft. The anti-icing system prevents icing on the aircraft with use of bleed air heat-exchanged with outside air. The computer program includes a bleed air flow rate adjusting section that adjusts a flow rate of the bleed air supplied to a supply destination. The bleed air flow rate adjusting section uses a first relationship and a second relationship. The first relationship is a relationship between an altitude and a pressure upper limit that is an upper limit of pressure of the bleed air. The second relationship is a relationship between outside air temperature at which temperature of the bleed air reaches allowable temperature of a member through which the bleed air flows and a pressure upper limit that is an upper limit of pressure of the bleed air, and is provided based on the altitude. When outside air temperature is lower than outside air temperature at an intersection of the first relationship and the second relationship, the bleed air flow rate adjusting section adjusts the flow rate of the bleed air to suppress the pressure of the bleed air to the pressure upper limit or lower of the first relationship. When the outside air temperature is higher than the outside air temperature at the intersection, the bleed air flow rate adjusting section adjusts the flow rate of the bleed air to suppress the pressure of the bleed air to the pressure upper limit or lower of the second relationship.

A computer program according to the present invention controls an anti-icing system of an aircraft. The anti-icing system prevents icing on the aircraft with use of bleed air heat-exchanged with outside air. The computer program includes a bleed air flow rate adjusting section that adjusts a flow rate of the bleed air supplied to a supply destination. The bleed air flow rate adjusting section uses a first relationship and a temperature threshold. The first relationship is a relationship between an altitude and a pressure upper limit that is an upper limit of pressure of the bleed air. The temperature threshold is set lower by a predetermined value than allowable temperature of a member through which the bleed air flows. When temperature of the bleed air is lower than the temperature threshold, the bleed air flow rate adjusting section adjusts the flow rate of the bleed air to suppress the pressure of the bleed air to the pressure upper limit or lower of the first relationship. When the temperature of the bleed air is higher than the temperature threshold, the bleed air flow rate adjusting section adjusts the flow rate of the bleed air to suppress the temperature of the bleed air to the allowable temperature or lower.

A computer readable storage medium according to the present invention stores a computer program that controls an anti-icing system of an aircraft. The anti-icing system prevents icing on the aircraft with use of bleed air heat-exchanged with outside air. A bleed air flow rate adjusting section that is a module configuring the computer program adjusts a flow rate of the bleed air supplied to a supply destination. The bleed air flow rate adjusting section uses a first relationship and a second relationship. The first relationship is a relationship between an altitude and a pressure upper limit that is an upper limit of pressure of the bleed air. The second relationship is a relationship between outside air temperature at which temperature of the bleed air reaches allowable temperature of a member through which the bleed air flows and a pressure upper limit that is an upper limit of pressure of the bleed air, and is provided based on the altitude. When outside air temperature is lower than outside air temperature at an intersection of the first relationship and the second relationship, the bleed air flow rate adjusting section adjusts the flow rate of the bleed air to suppress the pressure of the bleed air to the pressure upper limit or lower of the first relationship. When the outside air temperature is higher than the outside air temperature at the intersection, the bleed air flow rate adjusting section adjusts the flow rate of the bleed air to suppress the pressure of the bleed air to the pressure upper limit or lower of the second relationship.

A computer readable storage medium according to the present invention stores a computer program that controls an anti-icing system of an aircraft. The anti-icing system prevents icing on the aircraft with use of bleed air heat-exchanged with outside air. A bleed air flow rate adjusting section that is a module configuring the computer program adjusts a flow rate of the bleed air supplied to a supply destination. The bleed air flow rate adjusting section uses a first relationship and a temperature threshold. The first relationship is a relationship between an altitude and a pressure upper limit that is an upper limit of pressure of the bleed air. The temperature threshold is set lower by a predetermined value than allowable temperature of a member through which the bleed air flows. When temperature of the bleed air is lower than the temperature threshold, the bleed air flow rate adjusting section adjusts the flow rate of the bleed air to suppress the pressure of the bleed air to the pressure upper limit or lower of the first relationship. When the temperature of the bleed air is higher than the temperature threshold, the bleed air flow rate adjusting section adjusts the flow rate of the bleed air to suppress the temperature of the bleed air to the allowable temperature or lower.

In addition, a method according to the present invention is a method of controlling an anti-icing system of an aircraft. The anti-icing system prevents icing on the aircraft with use of bleed air heat-exchanged with outside air. Here, a relationship between an altitude and a pressure upper limit that is an upper limit of pressure of the bleed air supplied to a supply destination is referred to as a first relationship, and a relationship between outside air temperature at which temperature of the bleed air reaches allowable temperature of a member through which the bleed air flows and a pressure upper limit that is an upper limit of pressure of the bleed air is referred to as a second relationship. The method includes: adjusting the flow rate of the bleed air to suppress the pressure of the bleed air to the pressure upper limit or lower of the first relationship when outside air temperature is lower than outside air temperature at an intersection of the first relationship and the second relationship; and adjusting the flow rate of the bleed air to suppress the pressure of the bleed air to the pressure upper limit or lower of the second relationship when the outside air temperature is higher than the outside air temperature at the intersection. The second relationship is provided based on the altitude.

A method according to the present invention is a method for controlling an anti-icing system of an aircraft. The anti-icing system prevents icing on the aircraft with use of bleed air heat-exchanged with outside air. Here, a relationship between an altitude and a pressure upper limit that is an upper limit of pressure of the bleed air supplied to a supply destination is referred to as a first relationship, and a temperature that is set lower by a predetermined value than allowable temperature of a member through which the bleed air flows is referred to as a temperature threshold. The method includes: adjusting a flow rate of the bleed air to suppress the pressure of the bleed air to the pressure upper limit or lower of the first relationship when the temperature of the bleed air is lower than the temperature threshold; and adjusting the flow rate of the bleed air to suppress the temperature of the bleed air to the allowable temperature or lower when the temperature of the bleed air is higher than the temperature threshold.

The present invention makes it possible to secure required anti-icing performance while continuing supply of the bleed air.

BRIEF DESCRIPTION OF THE DRAWINGS

FIG. 4 is a diagram illustrating map data according to the first embodiment;

DETAILED DESCRIPTION OF THE PREFERRED EMBODIMENTS

Figure 1:
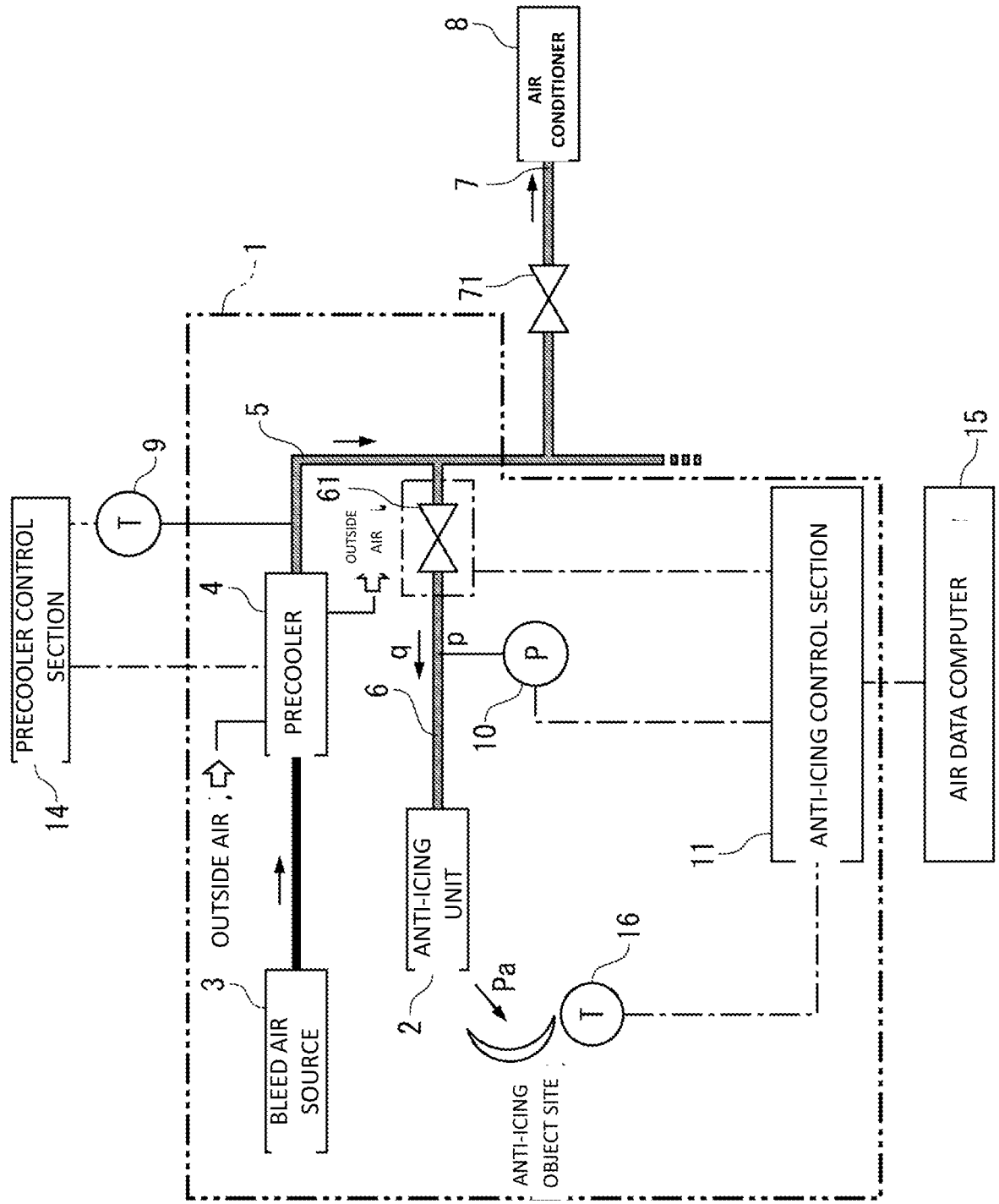
FIG. 1 is a diagram illustrating an outline configuration of an anti-icing system according to a first embodiment of the present invention.

Some embodiments of the present invention are described below with reference to accompanying drawings.

First Embodiment

An anti-icing system 1 (FIG. 1) that uses bleed air to prevent icing on a main wing is provided on an aircraft.

First, supply of the bleed air is briefly described.

The high-temperature high-pressure bleed air extracted from a bleed air source 3 is cooled by a precooler 4 to appropriate temperature, and the cooled bleed air is distributed to a plurality of units 2 and 8 that use the bleed air. Examples of the bleed air source 3 may include an engine and an auxiliary power unit of the aircraft.

The flow rate of the bleed air to the plurality of units 2 and 8 is individually restricted because excess extraction of the bleed air influences engine thrust and fuel consumption.

An anti-icing unit 2 is connected, by a supply line 6, to a main line 5 through which the bleed air that has passed through the precooler 4 flows.

An air conditioner 8 is connected, by a supply line 7, to the main line 5 through which the bleed air that has passed through the precooler 4 flows.

Each of the main line 5 and the supply lines 6 and 7 includes a duct, a coupling, and other components that are made of respective appropriate materials.

The supply lines 6 and 7 are respectively provided with flow rate valves 61 and 71 that adjust the flow rate of the bleed air.

An air conditioning system provided in the aircraft includes the bleed air source 3, the precooler 4, the air conditioner 8, and the flow rate valve 71.

The anti-icing system 1 includes the bleed air source 3, the precooler 4, the anti-icing unit 2, the flow rate valve 61, a pressure sensor 10, an anti-icing control section 11, and a precooler control section 14.

The anti-icing system 1 appropriately supply the bleed air to the anti-icing unit 2, in terms of anti-icing performance to prevent icing, flight performance of the aircraft, and mechanical strength retention of components of the bleed air lines.

The precooler 4 is a heat exchanger that exchanges heat between a duct of air out of the aircraft (outside air) and a duct of the bleed air from the bleed air source 3.

The precooler 4 is configured to adjust air volume (flow rate) of the taken-in outside air.

The bleed air that has been cooled by the heat exchange with the outside air flows through the main line 5, and the bleed air at the flow rate corresponding to opening of the flow rate valves 61 and 71 flows into the supply lines 6 and 7 and is then respectively supplied to the units 2 and 8.

The volume of the bleed air corresponding to the total flow rate supplied to the units 2 and 8 is extracted from the bleed air source 3.

The members such as the ducts and the valves that configure the precooler 4, the main line 5, and the supply line 6 are so designed as to cause the anti-icing unit 2 to exert sufficient anti-icing effect by supplying the bleed air with the predetermined flow rate at the predetermined temperature to the anti-icing unit 2, under an icing condition C1 described later.

In addition, in terms of mechanical strength retention of the members, the members such as the ducts and the valves that configure the lines 5 and 6 are so designed as to be maintained at respective allowable temperature AT or lower, under the icing condition C1, in addition to the members such as the ducts and the valves that configure the precooler 4 into which the bleed air flows from the bleed air source 3.

The anti-icing unit 2 includes a tube to which the bled air is supplied through the supply line 6. The tube of the anti-icing unit 2 is disposed along an unillustrated leading edge of a main wing. The leading edge of the main wing includes a slat serving as a high lift device.

A plurality of air blowout holes are provided with intervals in a length direction in the tube of the anti-icing unit 2.

The bleed air is blown to an inside of the leading edge from the air blowout holes. The blown bleed air flows rearward along an inner circumferential part of the leading edge and flows out of the aircraft through a gap between the slat and the mother wing or other gaps.

The anti-icing unit 2 blows the bled air to the inside of the leading edge to maintain the temperature of a skin surface of the leading edge and the vicinity thereof at a freezing point of water or higher, thereby preventing icing on the main wing.

Figure 2:
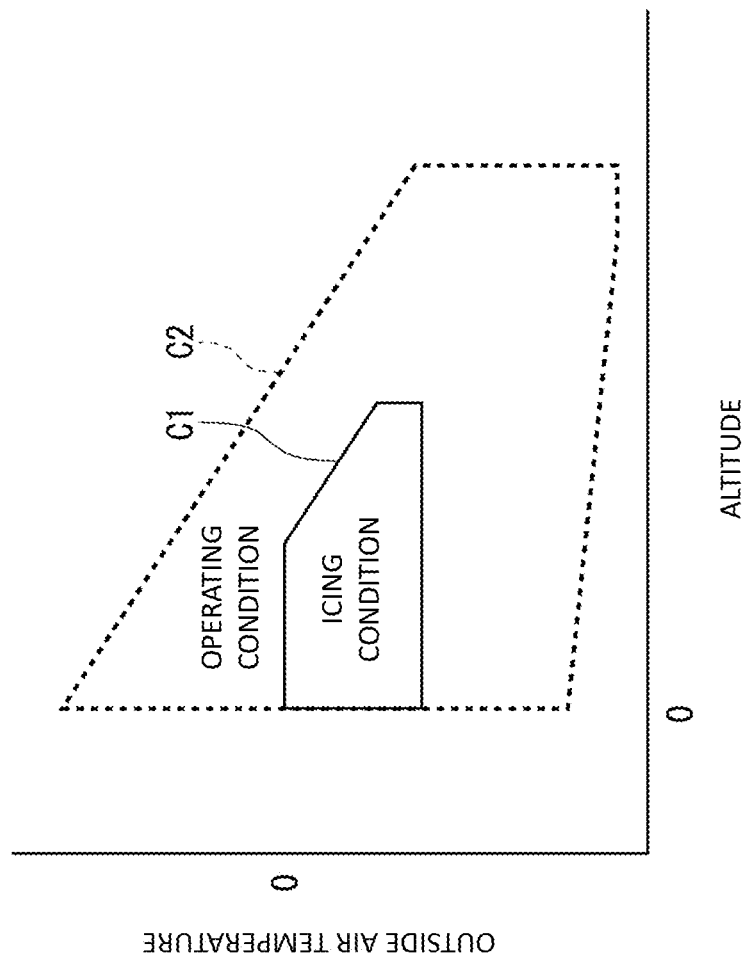
FIG. 2 is a diagram illustrating an icing condition and an operating condition of an aircraft.

In the present embodiment, to control anti-icing, the icing condition C1 and an operating condition C2 that is wider than the icing condition C1 are considered as illustrated in FIG. 2.

The icing condition C1 (in a solid-line frame) indicates a range of an altitude and outside air temperature of the specified icing condition. It is required to prevent icing under the icing condition C1.

The operating condition C2 (in a dashed-line frame) indicates a range of an altitude and outside air temperature at which the aircraft according to the present invention can fly.

The operating condition C2 encompasses the entire icing condition C1.

Although the anti-icing is required under the icing condition C1, functioning of the anti-icing unit 2 at the altitude and the outside air temperature that are out of the icing condition C1 but within the operating condition C2 is necessary for performance improvement.

The anti-icing control section 11 controls the flow rate of the bleed air supplied to the anti-icing unit 2 in order to sufficiently prevent icing on the main wing while securing the flight performance of the aircraft and maintaining, at the respective allowable temperature AT or lower, the temperature of the members configuring the lines through which the bleed air flows. The members configuring the bleed air lines reliably retain the mechanical strength at the respective allowable temperature AT or lower.

Figure 3:
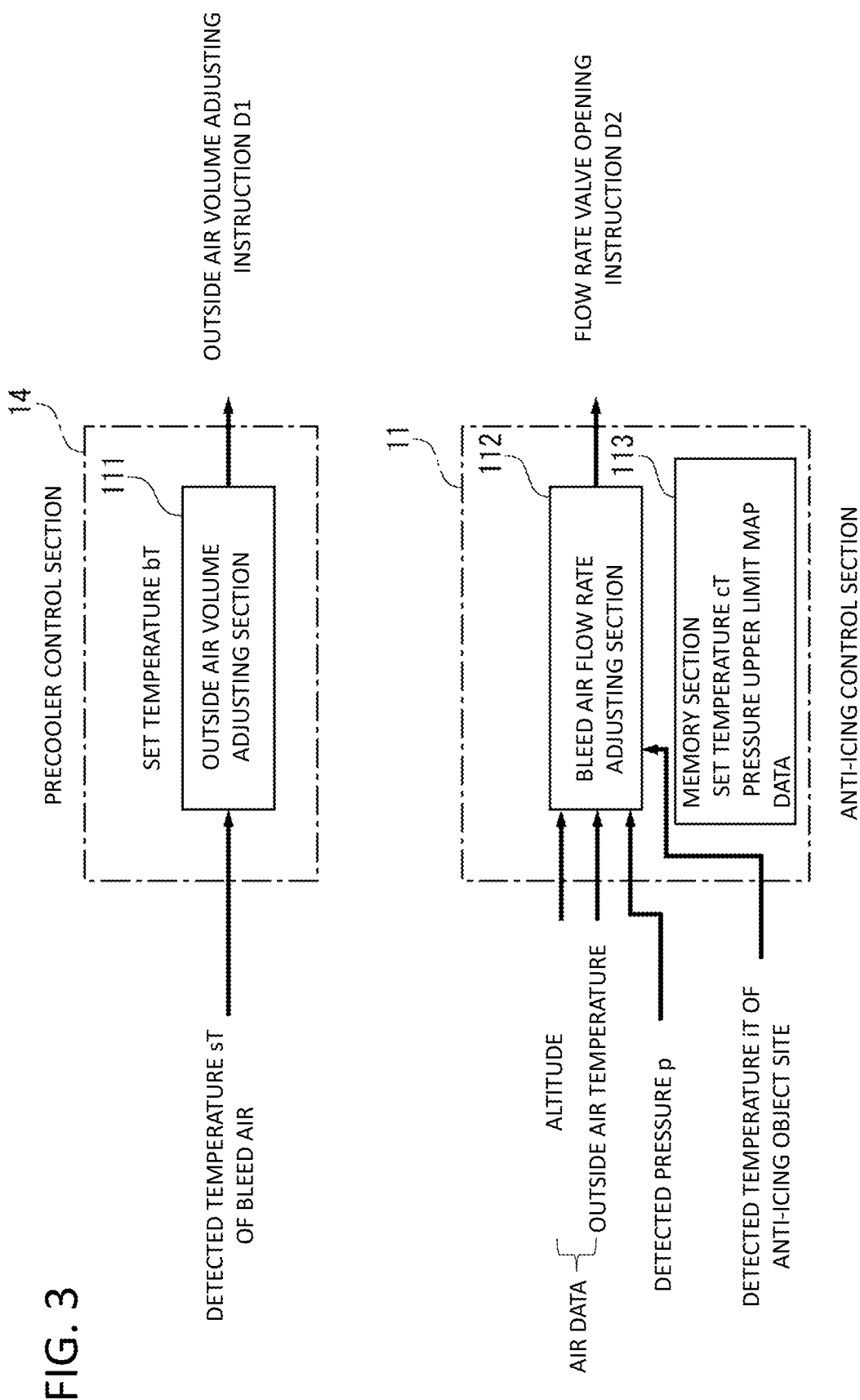
FIG. 3 is a diagram illustrating data and a control instruction used by an anti-icing control section according to the first embodiment.

FIG. 3 is a diagram illustrating data and a control instruction used by the anti-icing control section 11.

The anti-icing control section 11 is a computer including an arithmetic processing unit and a memory unit.

Processing by the anti-icing control section 11 is executed by computer programs.

The anti-icing control section 11 includes: a bleed air flow rate adjusting section 112 that adjusts the flow rate of the bleed air flowing through the supply line 6; and a memory section 113 that holds or stores data and computer programs necessary for various processing. The bleed air flow rate adjusting section 112 is a module configuring the computer programs.

The precooler control section 14 includes an outside air volume adjusting section 111. The outside air volume adjusting section 111 adjusts the volume of the outside air (hereinafter, referred to as outside air volume) that is taken into the precooler 4 in order to cool the bleed air.

To more sufficiently prevent icing, the upper limit pressure of the bleed air is determined in order to supply the maximum quantity of the bleed air under various restriction condition, in consideration of the altitude and the outside air temperature that are out of the icing condition C1 but within the operating condition C2, in addition to the altitude and the outside air temperature within the icing condition C1 mentioned above. Even if an error exists between data of the altitude and the outside air temperature that are acquired by an air data computer 15 provided in the aircraft and an actual altitude of the aircraft and actual outside air temperature of the skin surface, a margin for the error is left to appropriately achieve anti-icing.

As basic processing to prevent icing, the precooler control section 14 (FIGS. 1 and 3) adjusts the volume of the outside air taken into the precooler 4 by the outside air volume adjusting section 111 so as to obtain the bleed air at set temperature bT while detecting, by the temperature sensor 9, temperature t of the bleed air that is flown out from the precooler 4 (detected temperature sT). Then, the anti-icing control section 11 (FIGS. 1 and 3) adjusts, by the bleed air flow rate adjusting section 112, the flow rate q of the bleed air flowing through the supply line 6 based on detected temperature iT such that the temperature of the anti-icing object site becomes set temperature cT. The detected temperature iT is detected by a temperature sensor 16 provided at the anti-icing object site (for example, the slat).

The set temperature cT suitable for anti-icing may be held by the memory section 113 (FIG. 3) of the anti-icing control section 11.

An example of the basic processing to prevent icing is briefly described.

When the detected temperature sT (FIG. 3) of the bleed air detected by the temperature sensor 9 is higher than the set temperature bT, the outside air volume adjusting section 111 issues a control instruction D1 to increase the outside air volume of the precooler 4, thereby increasing heat exchange amount between the outside air and the bleed air. As a result, the temperature of the bleed air flown out from the precooler 4 is decreased. If the detected temperature sT of the bleed air is still higher than the set temperature bT, supply of the bleed air is stopped. Note that the capacity of the precooler 4 is designed by considering the bleed air supply amount of the anti-icing unit such that maximizing the outside air volume of the precooler 4 makes the detected temperature sT lower than the set temperature bT even at any altitude and any outside air temperature under the icing condition C1, namely, within the range of the altitude and the outside air temperature of the specified icing condition.

Further, the bleed air flow rate adjusting section 112 adjusts, by the flow rate valve 61, the bleed air flow rate in terms of the flight performance of the aircraft and the mechanical strength retention of the members through which the bleed air flows.

Therefore, in the first embodiment, the map data 12 of the pressure upper limit P illustrated in FIG. 4 is used. The map data 12 may be also held by the memory section 113 (FIG. 3).

The pressure upper limit P configuring the two-dimensional map data 12 is an upper limit of the pressure p of the bleed air flowing through the supply line 6. The pressure p of the bleed air flowing through the supply line 6 is detected by the pressure sensor 10 at downstream of the flow rate valve 61. The flow rate q of the bleed air that flows to the anti-icing unit 2 through the supply line 6 and is blown to the inside of the leading edge of the main wing to flow out to the outside air is derived from pressure difference between the pressure p of the bleed air at downstream of the flow rate valve 61 and the outside air pressure Pa, pressure loss by the ducts or other members, and a (fixed) area of the opening. Therefore, determination of the upper limit P of the pressure p of the bleed air corresponds to determination of the upper limit of the flow rate q of the bleed air.

The map data 12 is configured of the pressure upper limit P that is a function of two factors, the altitude of the aircraft and the outside air temperature. Each of an altitude factor (E1) and an outside air temperature factor (E2) in the map data 12 is a set of discrete values with appropriate intervals. The altitude value over the entire operating condition C2 (FIG. 2) is provided to the altitude factor E1. The value of the outside air temperature over the entire operating condition C2 (FIG. 2) is provided to the outside air temperature factor E2.

The pressure upper limit P is provided to each of all combinations of the factors E1 and E2. For example, the pressure upper limit P(0, 0) is provided to the combination of an altitude a0 and outside air temperature t0, and the pressure upper limit P(0, 1) is provided to the combination of the altitude a0 and outside air temperature t1.

Figure 5:
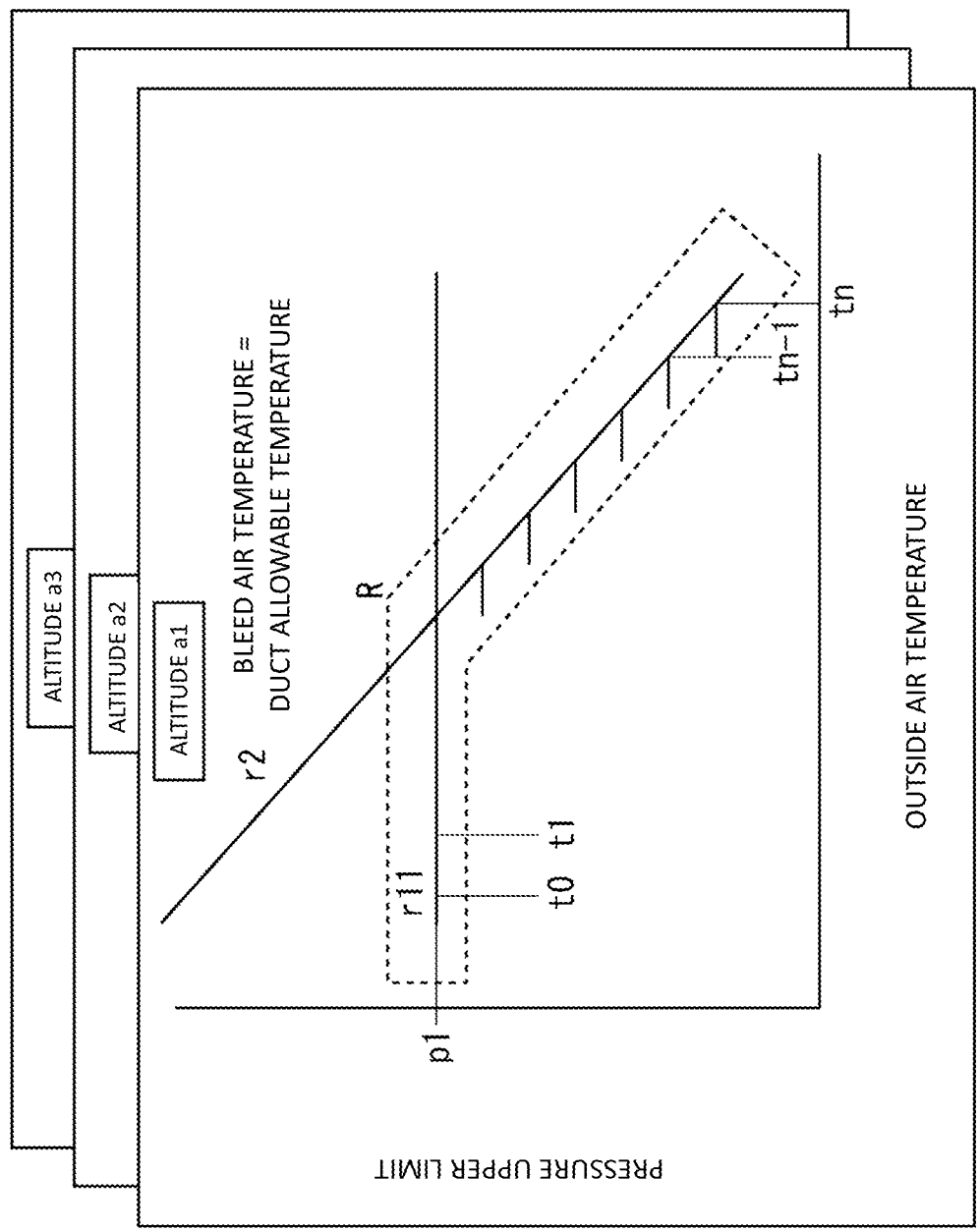
FIG. 5 is a diagram illustrating indices used in anti-icing control.

The pressure upper limit P configuring the map data 12 is determined based on a control index R illustrated in FIG. 5.

Individual control indices R are established for the respective values (a0, a1, . . . , an) of the altitude factor (E1) in FIG. 4. FIG. 5 is a diagram illustrating the control index R that is established at a certain altitude.

The control index R is an index used for anti-icing control that includes anti-icing performance under the icing condition C1 and anti-icing performance under an icing condition out of the icing condition C1, in terms of securement of the flight performance and the strength retention of the members through which the bleed air flows. The control index R indicates relationship between the outside air temperature and the pressure upper limit that are set according to the altitude (a0, a1, . . . , an).

Figure 6:
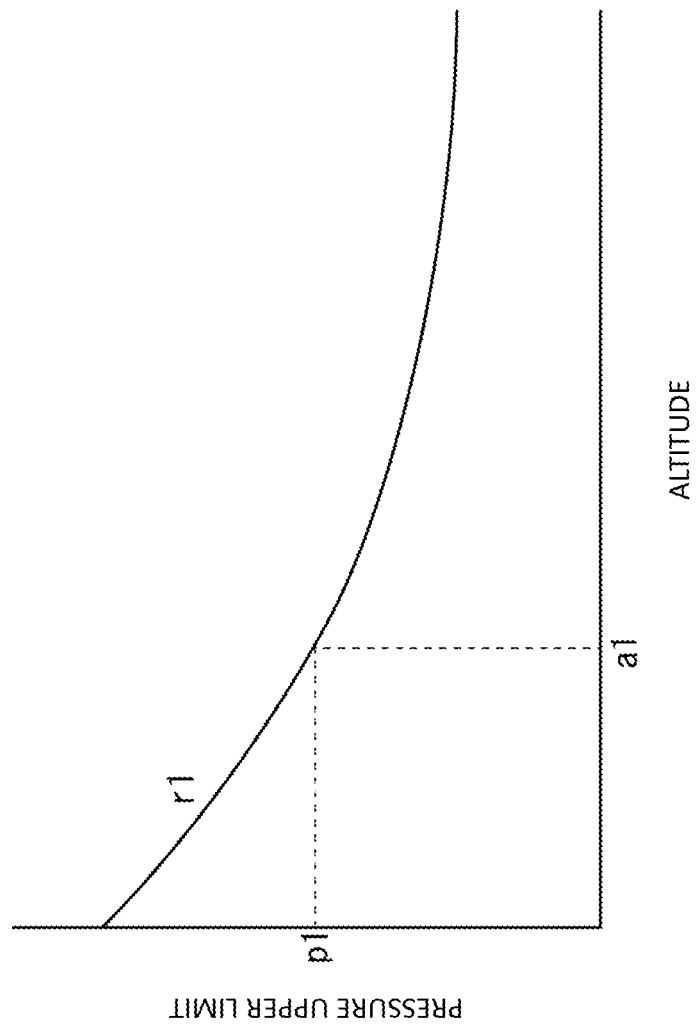
FIG. 6 is a diagram illustrating a relationship between a pressure upper limit at upstream of an anti-icing unit and an altitude.

The control index R is obtained from relationship r1 between the altitude and the pressure upper limit illustrated in FIG. 6 and relationship r2 between the outside air temperature and the pressure upper limit at respective altitudes illustrated in FIG. 5.

First, the relationship r1 (FIG. 6) is described.

Since the outside pressure decreases as the altitude increases, smaller bleed air pressure p makes it possible to secure pressure difference with the outside pressure for necessary flow rate q of the bleed air. Accordingly, the necessary bleed air pressure p decreases as the altitude increases.

When the pressure upper limit is determined according to the altitude as with the relationship r1 illustrated in FIG. 6, based on the above relationship, the flow rate q of the bleed air supplied to the anti-icing unit 2 does not exceed a certain upper limit. Therefore, the bleed air is not excessively extracted from the bleed air source 3, which makes it possible to maintain thrust and fuel consumption of the engine and the auxiliary power unit.

When the aircraft is operated under the icing condition C1 (FIG. 2), the bleed air pressure p is maintained at the pressure upper limit or lower illustrated in FIG. 6.

The pressure upper limit (for example, p1) is provided to the certain altitude (for example, a1) from the relationship r1 of FIG. 6. The pressure upper limit is expressed by a straight line r11 in the control index R (FIG. 5). The pressure upper limit expressed by the straight line r11 is fixed irrespective of the outside air temperature.

Next, the pressure upper limit is varied according to the outside air temperature in the relationship r2 (FIG. 5). A line expressing the relationship r2 intersects with the above-described straight line r11. This similarly occurs in any of the control indices R that are individually established at the respective altitudes (a0, a1, . . . , an).

The relationship r2 indicates the relationship between the outside air temperature and the pressure upper limit at each altitude at which the temperature of the bleed air reaches the respective allowable temperature AT, in consideration of the mechanical strength retention, of the members (hereinafter, referred to as the "ducts and other members") configuring the lines 5 and 6 through which the bleed air that has passed through the precooler 4 flows. The pressure upper limit of the relationship r2 indicates the volume of the bleed air that causes the temperature of the ducts and other members to reach the allowable temperature AT, according to the outside air temperature.

It is not possible for the cooling capacity by the precooler 4 to maintain the temperature of the bleed air to the set temperature bT or lower, for example, to the allowable temperature AT or lower near a point at which the outside air temperature exceeds the intersection of the straight line r11 and the line expressing the relationship r2, namely, out of the range of the icing condition C1 as the outside air temperature further increases. This is because the cooling capacity of the precooler 4 has specification to satisfy the anti-icing capacity within the range of the icing condition C1. The temperature of the bleed air after heat exchange increases as the temperature of the outside air (the outside air temperature) serving as a refrigerant increases. The flow rate q of the bleed air cooled by the precooler 4, however, is reduced by the bleed air flow rate adjusting section 112 according to the increase of the outside air temperature so as to maintain the temperature of the bleed air at the set temperature bT or lower, which reduces the absolute amount of a cooling object. As a result, it is possible to suppress temperature increase of the bleed air.

Therefore, the pressure upper limit indicating the volume of the bleed air that causes the temperature of the ducts and other members to reach the allowable temperature AT decreases as the outside air temperature increases.

The temperature of the ducts and other members is maintained at the allowable temperature AT or lower within the range of the outside air temperature and the pressure upper limit located on the lower side of the line expressing the relationship r2 in FIG. 5. The outside air volume of the precooler 4 is set to maximum because of high outside air temperature, and further the bleed air pressure p is suppressed to the pressure upper limit or lower of the relationship r2. Therefore, the temperature of the ducts and other members does not exceed the allowable temperature AT.

This does not lead interruption processing to stop the supply of the bleed air in overheating of the ducts and other members.

The control index R includes a low temperature section of the straight line r11 and a high temperature section of the relationship r2 as surrounded by dashed line in FIG. 5. In the control index R, the straight line r11 and the line expressing the relationship r2 are switched at the outside air temperature at which the straight line r11 intersects with the line expressing the relationship r2. In other words, the pressure upper limit expressed by the straight line r11 becomes equal to the pressure upper limit expressed by the line expressing the relationship r2 at the outside air temperature at which the straight line r11 intersects with the line expressing the relationship r2. When the outside air temperature is equal to outside air temperature at the intersection of the straight line r11 and the line expressing the relationship r2, the pressure upper limit is determined based on the straight line r11 or the relationship r2. In other words, in this case, the bleed air flow rate adjusting section 112 adjusts the bleed air flow rate q based on the temperature of the anti-icing object site while suppressing the bleed air pressure p of to the pressure upper limit or lower of the first relationship or the second relationship.

According to the control index R, the pressure upper limit is determined based on the straight line r11 on side in which the outside air temperature is lower than the intersection of the straight line r11 and the line expressing the relationship r2, and the pressure upper limit is determined based on the relationship r2 on side in which the outside air temperature is higher than the intersection of the straight line r11 and the line expressing the relationship r2. This makes it possible to achieve both maintenance of the thrust and fuel consumption and mechanical strength retention of the ducts and other members.

In the present embodiment, the map data 12 (FIG. 4) is fabricated based on the control index R.

In the section of the relationship r2 in the control index R, the pressure upper limits ( . . . , pn–1, pn) corresponding to respective values ( . . . , tn–1, tn) of the outside air temperature that are discrete with respect to a certain altitude ax out of the discrete altitude values, are used for the map data 12.

Further, also in the section of the straight line r11 in the control index R, the pressure upper limits (p0, p1, . . . ) corresponding to the respective values (t0, t1, . . . ) of the outside air temperature that are discrete with respect to the certain altitude ax out of the discrete altitude values, are used for the map data 12. The pressure upper limits are fixed irrespective of the outside air temperature.

The set of the pressure upper limits determined based on the control index R that is established at the certain altitude corresponds to one line of the map data 12 as surrounded by a thick line frame in FIG. 4.

The pressure upper limits corresponding to the respective discrete values of the outside air temperature are derived with use of the control indices R at the respective altitudes (a0, a1, . . . , an), which makes it possible to complete the map data 12.

The map data 12 obtained in the above-described manner is used to control the anti-icing.

The anti-icing control section 11 reads the map data 12 at the altitude and the outside air temperature that are obtained by the air data computer 15, and sets the pressure upper limit P, through the above-described basic processing. The anti-icing control section 11 then adjusts the opening of the flow rate valve 61 based on the detected temperature iT of the anti-icing object site such that the pressure becomes equal to or lower than the upper limit P. At this time, since the detected temperature sT of the bleed air does not exceed the set temperature bT under the condition of the read upper limit value P or lower, supply of the bleed air is not stopped.

The anti-icing control section 11 then sets the bleed air pressure p to the pressure upper limit P(n, 0) of the map data 12, for example, at the altitude an and the outside air temperature t0. Further, the anti-icing control section 11 issues a control instruction D2 to adjust the opening of the flow rate valve 61 with the pressure upper limit or lower, based on the detected temperature iT of the anti-icing object site.

The pressure upper limit P of the map data 12 is determined based on the above-described control index R, and the bleed air flow rate q is reduced according to the pressure upper limit of the map data 12. Therefore, the temperature of the ducts and other members through which the bleed air flows does not exceed the allowable temperature AT.

Even if the flow rate of the bleed air supplied to the anti-icing unit 2 is reduced according to the pressure upper limit, icing is prevented at certain capacity not only under the icing condition C1 in which the anti-icing capacity is essentially secured but also under the operating condition C2.

The pressure upper limit of the relationship r2 (FIG. 5) indicates relationship between the pressure upper limit and the outside air temperature at which the temperature of the bleed air reaches the allowable temperature AT of the ducts and other members. The relationship secures the bleed air pressure p up to or close to the pressure upper limit expressed by the relationship r2 while allowing the temperature of the ducts and other members to reach the allowable temperature AT or a value close to the allowable temperature AT. This makes it possible to obtain constant bleed air flow rate.

Accordingly, when the anti-icing unit is operated within the range that is out of the icing condition C1 but under the condition in which the anti-icing performance is not required and icing is moderate, namely, within the range out of the specified icing condition, it is possible to exert constant anti-icing capacity even at the high outside air temperature (or in an airspace in which air density of the outside air is low).

The pressure upper limit increases as the outside temperature decreases in the relationship r2. This indicates that it is possible to increase the bleed air flow rate at the low temperature; however, the pressure of the bleed air is limited (r11) in order to prevent excess extraction of the bleed air from the bleed air source 3, and the intersection of the line expressing the relationship r2 and the straight line r11 serve as the switching point.

The above-described series of anti-icing control that includes the basic processing and the processing of controlling the bleed air flow rate based on the control index R makes it possible to sufficiently prevent icing on the main wing while securing the flight performance of the aircraft and maintaining the temperature of the members through which the bleed air flows at the respective allowable temperature AT or lower.

In the present embodiment, since the bleed air pressure p is adjusted with use of the above-described relationship r2, the bleed air flow rate is reduced when the bleed air is not sufficiently cooled because of high outside air temperature. This maintains the temperature of the bleed air that has passed through the precooler 4 at constant temperature that does not exceed the allowable temperature AT. This eliminates the interruption of the supply of the bleed air due to overheating of the ducts and other members, and it is possible to maintain constant anti-icing performance under the moderate icing condition out of the icing condition C1.

In addition, using the map data 12 of the pressure upper limit makes it possible to immediately acquire the pressure upper limit from the map data 12.

Mapping of the pressure upper limit is easier than setting of a numerical expression that accurately derives the pressure upper limit serving as a function of the altitude and the outside air temperature. In addition, using the map data 12 eliminates the need for solving the numerical expression, which allows for the increase of the processing speed.

Second Embodiment

Next, a second embodiment of the present invention is described with reference to FIG. 7 to FIG. 9.

Matters different from the first embodiment are mainly described below. Components similar to those of the first embodiment are denoted by the same reference numerals.

Figure 7:
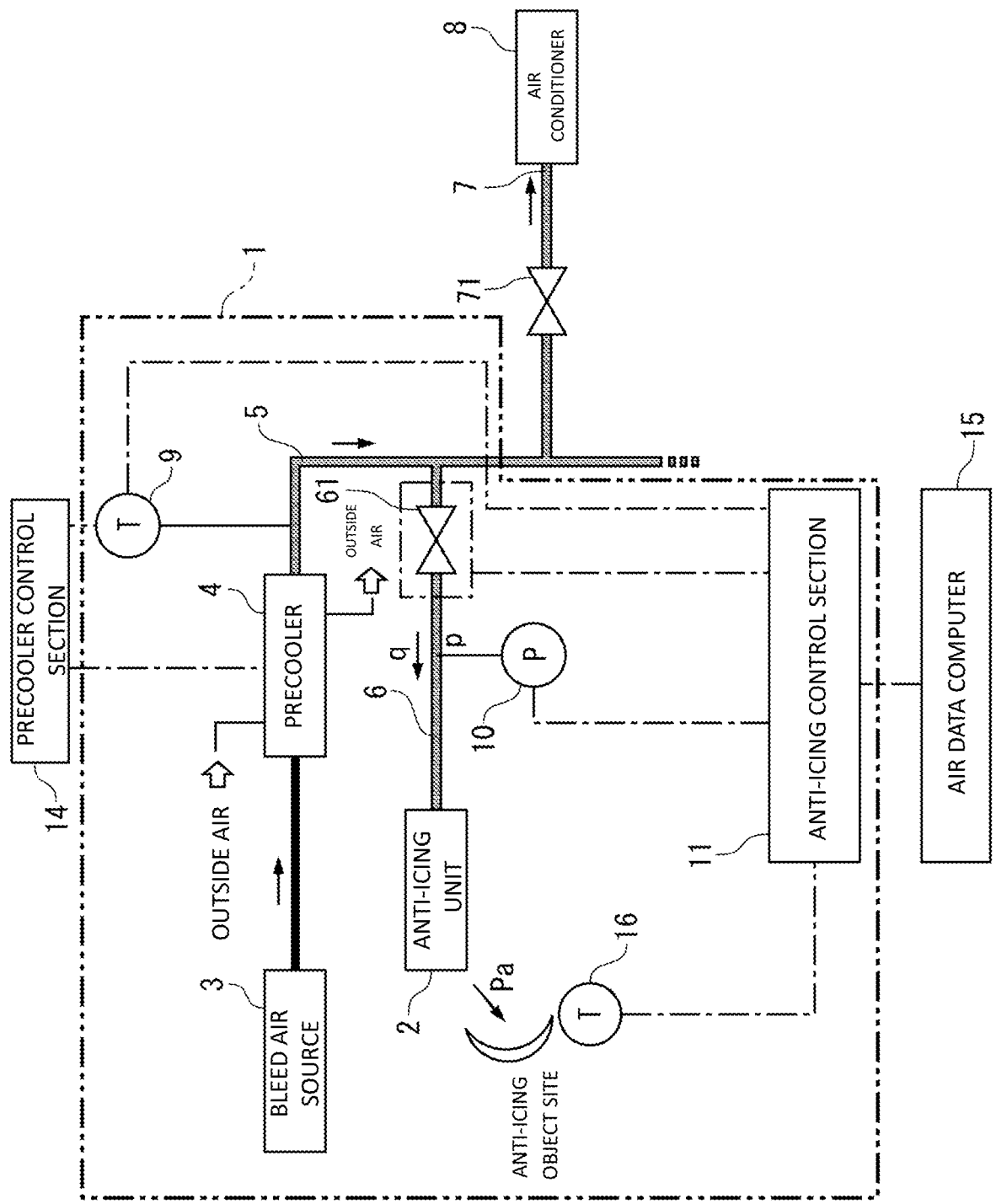
FIG. 7 is a diagram illustrating an outline configuration of an anti-icing system according to a second embodiment of the present invention.
Figure 8:
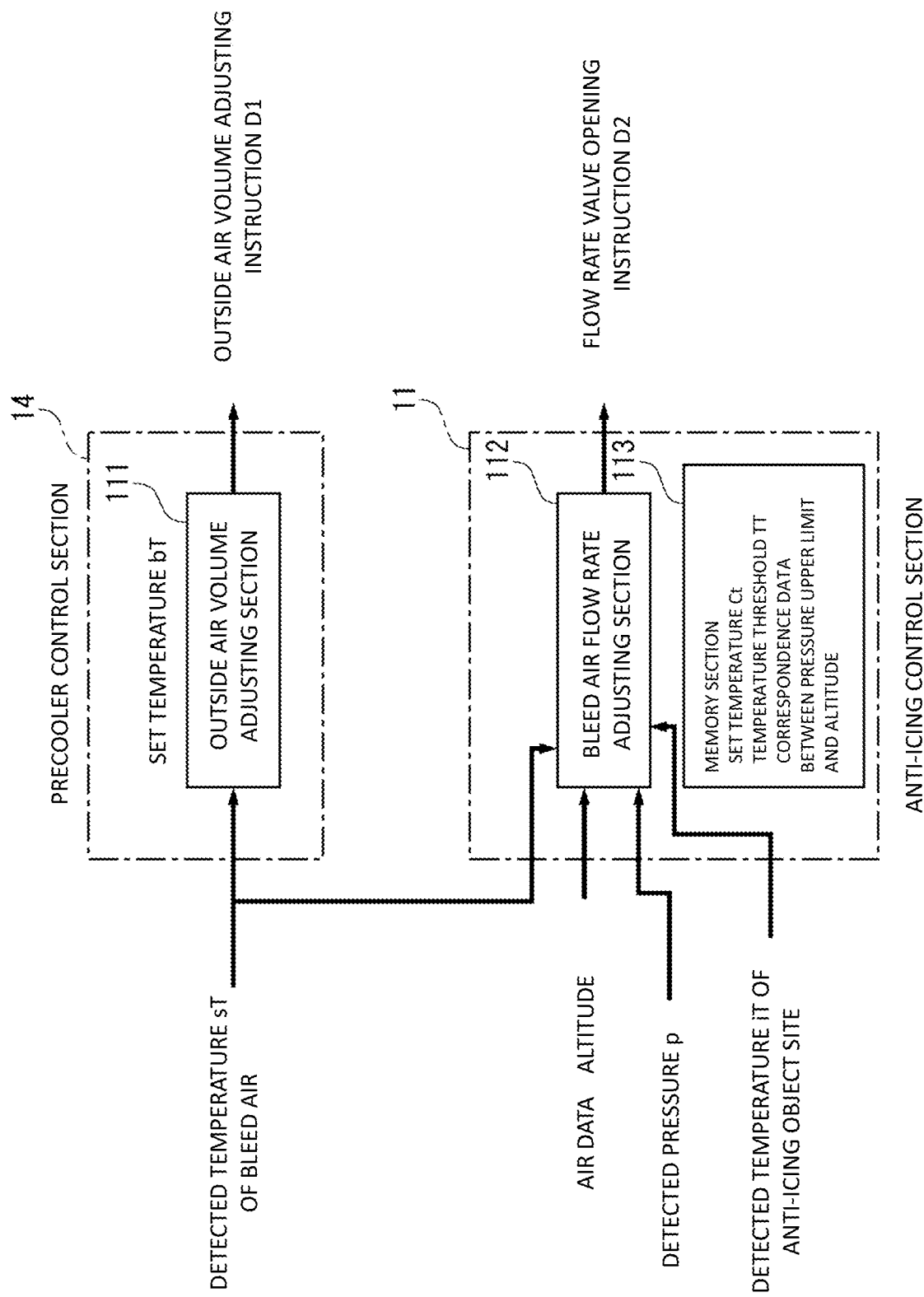
FIG. 8 is a diagram illustrating data and a control instruction used by an anti-icing control section according to the second embodiment.

An anti-icing system according to the second embodiment is an anti-icing system 1 illustrated in FIG. 7, and has a similar configuration to that of the first embodiment illustrated in FIG. 1 except that the anti-icing control section 11 of the anti-icing system 1 is connected to the temperature sensor 9.

In the anti-icing control according to the second embodiment, the map data 12 (FIG. 4) of the pressure upper limit that is the function of the altitude and the outside air temperature is not used but the first relationship r1 (FIG. 6) and the temperature threshold TT that is set for the allowable temperature AT are used.

The temperature threshold TT is set to temperature that is lower by a predetermined value than the allowable temperature AT so as to prevent the temperature t of the bleed air from exceeding the respective allowable temperature AT of the ducts and other members.

Figure 9:
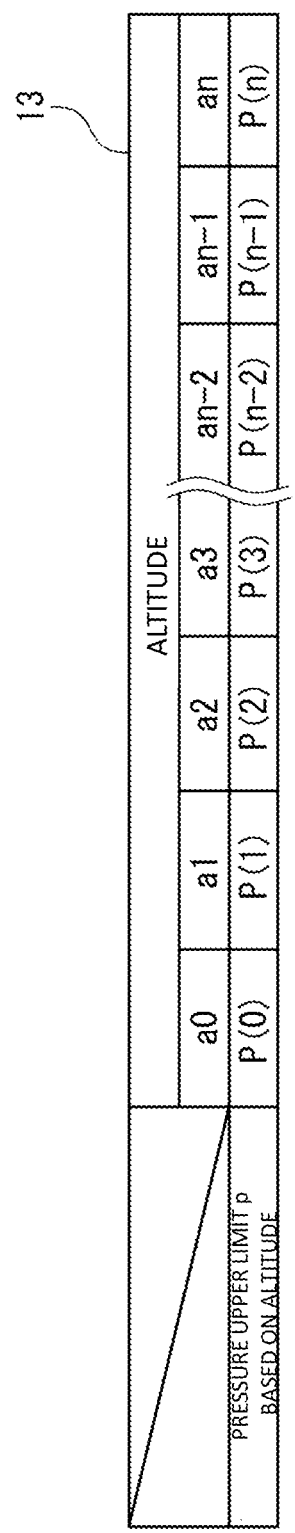
FIG. 9 is a diagram illustrating a map according to the second embodiment.

In the present embodiment, the memory section 113 (FIG. 8) of the anti-icing control section 11 holds the temperature threshold TT and correspondence data 13 (FIG. 9) between the pressure upper limit value and the altitude as illustrated in FIG. 9.

As illustrated in FIG. 9, the pressure upper limits P are provided for the respective altitudes in the correspondence data 13, and the correspondence data 13 has the first relationship r1 illustrated in FIG. 6.

The processing by the bleed air flow rate adjusting section 112 (FIG. 8) of the anti-icing control section 11 according to the present embodiment is described.

The bleed air flow rate adjusting section 112 reads, from the correspondence data 13, data corresponding to the altitude that is acquired from the air data computer 15. When the detected temperature sT detected by the temperature sensor 9 is equal to or lower than the temperature threshold TT, the bleed air flow rate adjusting section 112 adjusts the bleed air flow rate q based on the temperature of the anti-icing object site while suppressing the bleed air pressure p to the pressure upper limit P or lower that is uniquely provided according to the altitude, as with the first embodiment.

In contrast, when the detected temperature sT is higher than the temperature threshold TT, the bleed air flow rate adjusting section 112 adjusts the bleed air flow rate q based on the temperature of the anti-icing object site while reducing the bleed air flow rate q through opening adjustment of the flow rate valve 61 so as to suppress the detected temperature sT detected by the temperature sensor 9 to the allowable temperature AT or lower.

It is possible to more reliably suppress the temperature of the ducts and other members to the respective allowable temperature AT or lower without using the outside air temperature of the air data as mentioned above.

Reducing the bleed air flow rate based on the detected temperature sT of the bleed air largely secures the bleed air flow rate based on linear relationship between the estimated outside air temperature and the bleed air pressure p, as compared with a case of the stepwise relationship (FIG. 5) using the map data 12 (FIG. 4) that is the function of the altitude and the outside air temperature. Therefore, since the larger amount of the bleed air is supplied to the anti-icing unit 2, it is possible to more sufficiently prevent icing.

Other than the above description, the configurations of the above-described embodiments may be selected or may be appropriately modified without departing from the scope of the present invention.

In the first embodiment, a numerical expression expressing the relationship r1 and a numerical expression expressing the relationship r2 may be used in place of the map data 12.

In the second embodiment, the numerical expression expressing the relationship r1 and the temperature threshold TT may be used in place of the correspondence data 13.

When the bleed air cooled by the outside air is supplied to a tail wing, a windshield, and the like in order to prevent icing, it is possible to apply the anti-icing system according to the present invention to the tail wing and the windshield.

In the first embodiment, the control is switched at the intersection of the straight line r11 of the first relationship r1 and the second relationship r2. In the present invention, however, restrict switching of the control at such an intersection is not necessarily required, and the present invention encompasses switching of the control at a point slightly shifted from the intersection. For example, the control may be switched at a point that is shifted, according to any correction coefficient, from the intersection.

What is claimed is:

1. An anti-icing system of an aircraft, the anti-icing system preventing icing on the aircraft with use of bleed air heat-exchanged with outside air, the anti-icing system comprising:
 a heat exchanger that is configured to exchange heat between the bleed air and the outside air;
 a supply destination that is configured to receive the bleed air passed through the heat exchanger; and
 a control section that is configured to adjust a flow rate of the bleed air passed through the heat exchanger and subsequently supplied to the supply destination, wherein
 the control section includes a bleed air flow rate adjusting section that is configured to adjust the flow rate of the bleed air passed through the heat exchanger and subsequently supplied to the supply destination,
 the bleed air flow rate adjusting section uses a first relationship and a second relationship, the first relationship being a relationship between an altitude and a pressure upper limit that is an upper limit of pressure of the bleed air, the second relationship being a relationship between outside air temperature at which temperature of the bleed air reaches allowable temperature of a member through which the bleed air flows and a pressure upper limit that is an upper limit of pressure of the bleed air, the second relationship being provided based on the altitude, when outside air temperature is lower than outside air temperature at an intersection of the first relationship and the second relationship, the bleed air flow rate adjusting section is configured to adjust the flow rate of the bleed air while suppressing the pressure of the bleed air to the pressure upper limit or lower of the first relationship, and when the outside air temperature is higher than the outside air temperature at the intersection of the first relationship and the second relationship, the bleed air flow rate adjusting section is configured to adjust the flow rate of the bleed air while suppressing the pressure of the bleed air to the pressure upper limit or lower of the second relationship.

2. The anti-icing system of the aircraft according to claim 1, wherein the bleed air flow rate adjusting section uses map data provided with the pressure upper limit, the pressure upper limit being a function of an altitude and outside air temperature, and the pressure upper limit of the map data is determined based on the first relationship and the second relationship.

3. An anti-icing system of an aircraft, the anti-icing system preventing icing on the aircraft with use of bleed air heat-exchanged with outside air, the anti-icing system comprising:

a heat exchanger that is configured to exchange heat between the bleed air and the outside air;

a supply destination that is configured to receive the bleed air passed through the heat exchanger; and a control section that is configured to adjust a flow rate of the bleed air passed through the heat exchanger and subsequently supplied to the supply destination, wherein the control section includes a bleed air flow rate adjusting section that is configured to adjust the flow rate of the bleed air passed through the heat exchanger and subsequently supplied to the supply destination, the bleed air flow rate adjusting section uses a first relationship and a temperature threshold, the first relationship being a relationship between an altitude and a pressure upper limit that is an upper limit of pressure of the bleed air, the temperature threshold being set lower by a predetermined value than allowable temperature of a member through which the bleed air flows, when temperature of the bleed air is lower than the temperature threshold, the bleed air flow rate adjusting section is configured to adjust the flow rate of the bleed air to suppress the pressure of the bleed air to the pressure upper limit or lower of the first relationship, and when the temperature of the bleed air is higher than the temperature threshold, the bleed air flow rate adjusting section is configured to adjust the flow rate of the bleed air to suppress the temperature of the bleed air to the allowable temperature or lower.

4. The anti-icing system of the aircraft according to claim 1, wherein an icing condition and an operating condition are assumed, the icing condition including an altitude and outside air temperature, and the operating condition encompassing the icing condition and being a range of an altitude and outside air temperature at which the aircraft is flyable, and the member through which the bleed air flows is configured to be used such that a temperature of the member is maintained at the allowable temperature or lower under the operating condition.

5. The anti-icing system of the aircraft according to claim 3, wherein an icing condition and an operating condition are assumed, the icing condition including an altitude and outside air temperature, and the operating condition encompassing the icing condition and being a range of an altitude and outside air temperature at which the aircraft is flyable, and the member through which the bleed air flows configured to be used such that a temperature of the member is maintained at the allowable temperature or lower under the operating condition.

6. An aircraft comprising the anti-icing system according to claim 1.

7. An aircraft comprising the anti-icing system according to claim 3.

8. A non-transitory computer readable storage medium storing a computer program having a bleed air flow rate adjusting module for controlling an anti-icing system of an aircraft to prevent icing on the aircraft with bleed air heat-exchanged with outside air by a heat exchanger, wherein execution of the computer program by a computer causes the computer to adjust a flow rate of the bleed air passed through the heat exchanger and subsequently supplied to a supply destination, wherein:

the bleed air flow rate adjusting section uses a first relationship and a second relationship the first relationship being a relationship between an altitude and a pressure upper limit that is an upper limit of pressure of the bleed air, the second relationship being a relationship between outside air temperature at which temperature of the bleed air reaches allowable temperature of a member through which the bleed air flows and a pressure upper limit that is an upper limit of pressure of the bleed air, the second relationship being provided based on the altitude, when outside air temperature is lower than outside air temperature at an intersection of the first relationship and the second relationship, the bleed air flow rate adjusting section is configured to cause the computer to adjust the flow rate of the bleed air to suppress the pressure of the bleed air to the pressure upper limit or lower of the first relationship, and when the outside air temperature is higher than the outside air temperature at the intersection of the first relationship and the second relationship, the bleed air flow rate adjusting section is configured to cause the computer to adjust the flow rate of the bleed air to suppress the pressure of the bleed air to the pressure upper limit or lower of the second relationship.

9. A non-transitory computer readable storage medium storing a computer program, the computer program having a bleed air flow rate adjusting module for controlling an anti-icing system of an aircraft to prevent icing on the aircraft with bleed air heat-exchanged with outside air by a heat exchanger, wherein execution of the computer program by a computer causes the computer to a flow rate of the bleed air passed through the heat exchanger and subsequently supplied to a supply destination, wherein the bleed air flow rate adjusting section uses a first relationship and a temperature threshold, the first relationship being a relationship between an altitude and a pressure upper limit that is an upper limit of pressure of the bleed air, the temperature threshold being set lower by a predetermined value than allowable temperature of a member through which the bleed air flows, when temperature of the bleed air is lower than the temperature threshold, the bleed air flow rate adjusting section is configured to cause the computer to adjust the flow rate of the bleed air to suppress the pressure of the bleed air to the pressure upper limit or lower of the first relationship, and when the temperature of the bleed air is higher than the temperature threshold, the bleed air flow rate adjusting section is configured to cause the computer to adjust the flow rate of the bleed air to suppress the temperature of the bleed air to the allowable temperature or lower.

10. A method for controlling an anti-icing system of an aircraft, the anti-icing system preventing icing on the aircraft with use of bleed air heat-exchanged with outside air by a heat exchanger, wherein a relationship between an altitude and a pressure upper limit that is an upper limit of pressure of the bleed air supplied to a supply destination is referred to as a first relationship, and a relationship between outside air temperature at which temperature of the bleed air reaches allowable temperature of a member through which the bleed air flows and a pressure upper limit that is an upper limit of pressure of the bleed air is referred to as a second relationship, the method comprising:

adjusting a flow rate of the bleed air passed through the heat exchanger and subsequently supplied to the supply destination to suppress the pressure of the bleed air to the pressure upper limit or lower of the first relationship when outside air temperature is lower than outside air temperature at an intersection of the first relationship and the second relationship, the second relationship being provided based on the altitude; and adjusting the flow rate of the bleed air passed through the heat exchanger and subsequently supplied to the supply destination to suppress the pressure of the bleed air to the pressure upper limit or lower of the second relationship when the outside air temperature is higher than the outside air temperature at the intersection of the first relationship and the second relationship.

11. A method for controlling an anti-icing system of an aircraft, the anti-icing system preventing icing on the aircraft with use of bleed air heat-exchanged with outside air by a heat exchanger, wherein a relationship between an altitude and a pressure upper limit that is an upper limit of pressure of the bleed air supplied to a supply destination is referred to as a first relationship, and a temperature that is set lower by a predetermined value than allowable temperature of a member through which the bleed air flows is referred to as a temperature threshold, the method comprising:

adjusting a flow rate of the bleed air passed through the heat exchanger and subsequently supplied to the supply destination to suppress the pressure of the bleed air to the pressure upper limit or lower of the first relationship when the temperature of the bleed air is lower than the temperature threshold; and adjusting the flow rate of the bleed air passed through the heat exchanger and subsequently supplied to the supply destination to suppress the temperature of the bleed air to the allowable temperature or lower when the temperature of the bleed air is higher than the temperature threshold.

12. The method for controlling an anti-icing system of an aircraft according to claim 10, further comprising using map data provided with the pressure upper limit, the pressure upper limit being a function of an altitude and outside air temperature, wherein the pressure upper limit of the map data is determined based on the first relationship and the second relationship.

13. The method for controlling an anti-icing system of an aircraft according to claim 10, further comprising assuming an icing condition and an operating condition, the icing condition including an altitude and outside air temperature, and the operating condition encompassing the icing condition and being a range of an altitude and outside air temperature at which the aircraft is flyable, wherein the member through which the bleed air flows is configured to be used such that a temperature of the member is maintained at the allowable temperature or lower under the operating condition.

14. The method for controlling an anti-icing system of an aircraft according to claim 11, further comprising assuming an icing condition and an operating condition, the icing condition including an altitude and outside air temperature, and the operating condition encompassing the icing condition and being a range of an altitude and outside air temperature at which the aircraft is flyable, wherein the member through which the bleed air flows is adapted to configured to be used such that a temperature of the member is maintained at the allowable temperature or lower under the operating condition.

15. The anti-icing system of the aircraft according to claim 1, further comprising a flow rate valve that is disposed in a line connecting the heat exchanger and the supply destination and is adjustable of a flow rate of the bleed air flowing through the line, wherein the control section is configured to adjust opening of the flow rate valve to adjust the flow rate of the bleed air passed through the heat exchanger and subsequently supplied from the line to the supply destination.

16. The anti-icing system of the aircraft according to claim 3, further comprising a flow rate valve that is disposed in a line connecting the heat exchanger and the supply destination and is adjustable of a flow rate of the bleed air flowing through the line, wherein the control section is configured to adjust opening of the flow rate valve to adjust the flow rate of the bleed air passed through the heat exchanger and subsequently supplied from the line to the supply destination.

17. The non-transitory computer readable storage medium storing the computer program according to claim 8, wherein the bleed air flow rate adjusting section is configured to adjust the flow rate of the bleed air passed through the heat exchanger and subsequently supplied to a supply destination by adjusting opening of a flow rate valve disposed downstream of the heat exchanger.

18. The non-transitory computer readable storage medium storing the computer program according to claim 9, wherein the bleed air flow rate adjusting section is configured to adjust the flow rate of the bleed air passed through the heat exchanger and subsequently supplied to a supply destination by adjusting opening of a flow rate valve disposed downstream of the heat exchanger.

19. The method according to claim 10, wherein the flow rate of the bleed air passed through the heat exchanger and subsequently supplied to the supply destination is adjusted by adjusting opening of a flow rate valve disposed downstream of the heat exchanger.

20. The method according to claim 11, wherein the flow rate of the bleed air passed through the heat exchanger and subsequently supplied to the supply destination is adjusted by adjusting opening of a flow rate valve disposed downstream of the heat exchanger.

\* \* \* \* \*